United States Patent
Asati et al.

(10) Patent No.: US 8,873,549 B2
(45) Date of Patent: Oct. 28, 2014

(54) MANAGING L2VPN CONNECTIVITY AFTER A FIBER NODE SPLIT

(75) Inventors: Rajiv Asati, Research Triangle Park, NC (US); John T. Chapman, Laguna Niguel, CA (US)

(73) Assignee: Cisco Technology, Inc., San Jose, CA (US)

(*) Notice: Subject to any disclaimer, the term of this patent is extended or adjusted under 35 U.S.C. 154(b) by 944 days.

(21) Appl. No.: 12/707,626

(22) Filed: Feb. 17, 2010

(65) Prior Publication Data

US 2011/0199894 A1 Aug. 18, 2011

(51) Int. Cl.
| | |
|---|---|
| H04L 12/28 | (2006.01) |
| H04L 12/24 | (2006.01) |
| H04L 12/721 | (2013.01) |
| H04L 12/723 | (2013.01) |
| H04L 12/46 | (2006.01) |

(52) U.S. Cl.
CPC ............ H04L 41/0846 (2013.01); H04L 45/68 (2013.01); H04L 12/2801 (2013.01); H04L 45/50 (2013.01); H04L 12/4679 (2013.01)
USPC .......................................... 370/389; 370/401

(58) Field of Classification Search
USPC .................. 370/389, 392, 401, 465
See application file for complete search history.

(56) References Cited

U.S. PATENT DOCUMENTS

| 6,310,862 | B1 * | 10/2001 | Roy ............................... 370/260 |
| 6,765,925 | B1 * | 7/2004 | Sawyer et al. ................ 370/465 |
| 7,480,237 | B2 * | 1/2009 | Nolle et al. .................... 370/229 |
| 7,512,969 | B2 * | 3/2009 | Gould et al. ...................... 726/4 |
| 7,668,178 | B2 * | 2/2010 | Martini et al. ........... 370/395.53 |
| 7,701,951 | B2 * | 4/2010 | Chapman et al. ........ 370/395.52 |
| 7,733,876 | B2 * | 6/2010 | Davie et al. ............. 370/395.53 |
| 7,817,553 | B2 * | 10/2010 | Parandekar ................... 370/235 |
| 8,117,338 | B2 * | 2/2012 | Ould-Brahim ................ 709/242 |
| 2008/0198849 | A1 | 8/2008 | Guichard et al. ............. 370/392 |
| 2010/0043068 | A1 * | 2/2010 | Varadhan et al. ............... 726/15 |

OTHER PUBLICATIONS

Cable Television Laboratories, Inc.; "TDM Emulation Interface Specification," CM-SP-TEI-I01-060512; May 12, 2006; 182 pages. (http://www.cablelabs.com/specifications/CM-SP-TEI-I01-060512.pdf).

* cited by examiner

Primary Examiner — Ricky Ngo
Assistant Examiner — Christine Ng
(74) Attorney, Agent, or Firm — Leon R. Turkevich

(57) ABSTRACT

In one example, a routing protocol is used to propagate or flood information over a network of Cable Modem Termination Systems (CMTSs) in response to a fiber node split that changes which of the CMTSs a cable modem is coupled thereto. The network processes the information and dynamically changes a pseudowire placement to maintain the Layer 2 Virtual Private Network (L2VPN) connectivity among cable modems of different CMTSs after the fiber node split.

20 Claims, 4 Drawing Sheets

MANAGING L2VPN CONNECTIVITY AFTER A FIBER NODE SPLIT

BACKGROUND

Cable operators have widely deployed high-speed data services on cable television systems. These data services allow subscriber-side devices, such as personal computers, to communicate over an ordinary cable TV network Hybrid Fiber Coax (HFC) cable plant. A Cable Modem Termination System (CMTS) connects the cable TV network to a data network, such as an Internet Protocol (IP)/MultiProtocol Label Switching (MPLS) network. The Data Over Cable Service Interface Specification (DOCSIS) is one of the cable standards used for transferring data over the cable TV network.

Some cable networks include several CMTSs each being associated with a corresponding fiber node and a corresponding plurality of downstream cable modems. These cable networks can include a Layer 2 Virtual Private Network (L2VPN) service that enables cable modems attached to different fiber nodes and CMTSs to operate in a same private network. To facilitate the L2VPN over DOCSIS service between the cable modems of different CMTSs/nodes, pseudowires are established between the respective CMTSs for exchanging traffic between devices behind the cable modems. These pseudowires are established according to configuration files stored on the cable modems. As described in the Business Services over DOCSIS (BSoD) L2VPN specification, particular services can be provided on the VPN using these pseudowires.

When one of the cable modems is moved to a different fiber node via a procedure referred to as a "fiber node split" (often performed for load splitting purposes), the two cable modems of the same VPN can lose communicativity with each other, resulting in a service outage. One partial solution is to update the configuration file of the remote "stationary" cable modem in conjunction with performing the fiber node split. However, updating this configuration file can be operationally difficult for service providers, which can lead to the service providers simply avoiding the fiber node split and suffering the associated performance issues. The disclosure that follows solves this and other problems.

DESCRIPTION OF EXAMPLE EMBODIMENTS

Overview

In one example, a routing protocol is used to propagate or flood information over a network of Cable Modem Termination Systems (CMTSs) in response to a fiber node split that changes which of the CMTSs a cable modem is coupled thereto. The network processes the information and dynamically changes a pseudowire placement to maintain the Layer 2 Virtual Private Network (L2VPN) connectivity among cable modems of different CMTSs after the fiber node split.

Description

Figure 1:
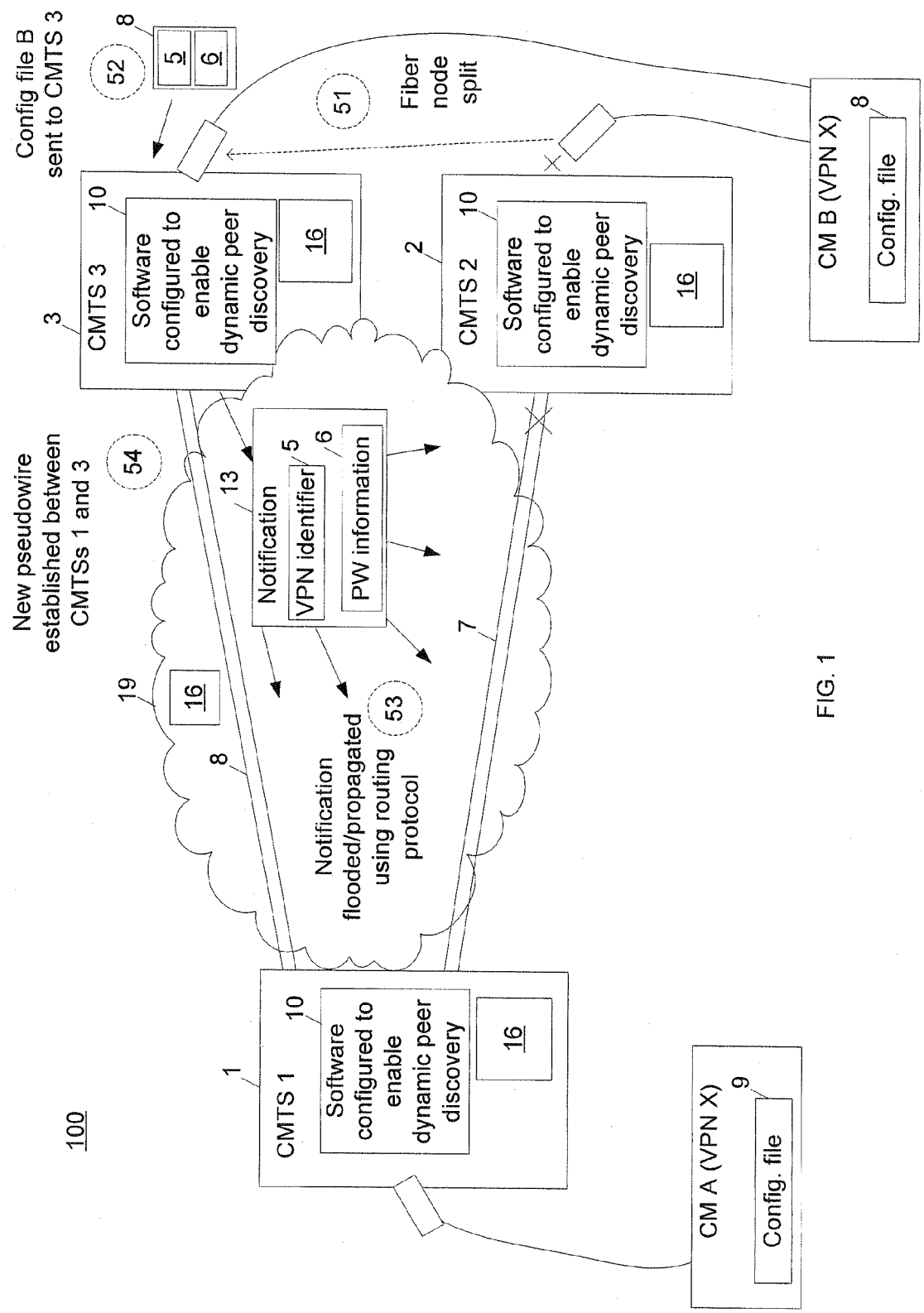
FIG. 1 illustrates a system for maintaining connectivity after a fiber node split.

FIG. 1 illustrates a system for maintaining connectivity after a fiber node split.

The system 100 includes a plurality of CMTSs 1-3 configured with software 10. The software 10 of the CMTSs 1-3 is configured to maintain Layer 2 Virtual Private Network (L2VPN) connectivity between two Cable Modems (CMs) A and B of a same VPN after a fiber node split (process 51), e.g. after CM B is disconnected from a fiber node of CMTS 2 and connected to a fiber node of CMTS 3.

Before discussing processes occurring after, or in conjunction with, the fiber node split (process 51), a background on Business Services over DOCSIS (BSoD) L2VPN will be provided in the next two paragraphs. Cable Modems distributed over a plurality of different physical locations (and in turn coupled to an Internet Protocol (IP)/MultiProtocol Label Switching (MPLS) network through different CMTSs) can operate on a same VPN, which provides numerous capabilities amongst the distributed locations as described in more detail in the BSoD L2VPN specification. To enable operation in a same VPN, one or more pseudowires are established over the IP/MPLS network connecting the respective CMTSs. An example of such a pseudowire 7 over the network 19 between CMTSs 1 and 2 of CMs A-B of the VPN X is shown in FIG. 1.

The pseudowire 7 is established between the CMTSs 1 and 2 based on information from configuration files 8 and 9 respectively stored on the CMs A and B. For example, configuration file 9 on CM A identifies the remote CMTS 2 of the CM B in the same VPN X. This configuration file 9 is provided to the CMTS 1 during registration of the CM A, and in turn, the CMTS 1 establishes the pseudowire 7 as illustrated in conjunction with registration of CM A. However, in a conventional system the CMTSs 1 and 2 will lose connectivity over the pseudowire 7 in the event that the CM B is moved to another CMTS (e.g. CMTS 3) in conjunction with a fiber node split (process 51) occurring at some point after the pseudowire 7 is established.

Referring now to the operation of the software 10, the software 10 is configured to operate in response to a fiber node split (process 51). The fiber node split (process 51) causes the CM B to send the configuration file 8 stored thereon (process 52) through a healing mechanism built into DOCSIS that triggers the CM B to register with the new CMTS 3. This configuration file 8 includes a value 5 corresponding to the VPN X of the CMs A and B and a value 6 indicating pseudowire information. The software 10 is configured to inspect the received configuration file and extract the values 5 and 6 therefrom.

The software 10 then generates a routing protocol message 13 according to a routing protocol 16 used within the IP/MPLS network 19. A routing protocol specifies how routers communicate with each other. Routing protocols are configured to propagate route information within a group of routers, by flooding new route information across a flooding domain (link state routing protocols), or propagating the new route information through the group of routers by first sending the new route information only to immediate neighbors (path vector or distance vector routing protocols), or any other known techniques. The routing protocol message 13 can correspond to any routing protocol existing on the network including but not limited to BGP and Interior Gateway Protocol (IGP). A specific example utilizing BGP will be discussed later with respect to FIGS. 2-4.

Referring still to FIG. 1, the notification 13 generated according to the routing protocol 16 includes the VPN identifier value 5 and the pseudowire information 6 (or other values representing these values 5 and 6 as will be discussed later by way of a BGP example). The notification 13 is then sent to one or more routers within the network 19 to propagate across the network (process 53), eventually reaching CMTSs 1 and 2.

Of particular interest is that the notification 13 is propagated across the network or flooded in a routing domain using the routing protocol 16 as opposed to merely sent from CMTS 3 to the CMTS 1-2. This is an important distinction because the former allows the CMTSs 1 and 2 to receive the notification 13 according to the routing protocol 16 regardless of whether CMTS 3 has even discovered CMTSs 1 and 2 (the CMTS 3 may not have any addressing information for CMTS 2 in particular), while the later would not. Also, the use of the routing protocol 16 that is already configured on the network 19 allows other routers of the network 19 that are not configured with the software 10 to participate in this propagation/flooding by simply operating according to the protocol 16.

The software 10 configured on the CMTS 1 receives the notification 13 and compares the information 5 and 6 contained therein to its local routing table and a list of associated VPNs. Based on the comparison, the software 10 causes the CMTS 1 to establish a new pseudowire 8 to the CMTS 3 according to information from the notification 13 (process 54). It should be apparent from the illustration that this new pseudowire 8 now can be used to exchange communications between the CMs A and B for providing L2VPN BSoD capabilities or for any other reason. The software 10 configured on CMTS 2 can tear down the pseudowire 7 if no other CMs of VPN X remain connected to its fiber node. Accordingly, a plurality of cable modems connected to different CMTSs can retain connectivity after a fiber node split.

Of particular interest is that the connectivity between CMs of a VPN distributed over a plurality of CMTSs can be retained without requiring changes to the configuration files of all the CMs, namely, the configuration files of the remote CM can remain constant before, during, and after the fiber node split for the local CM. The configuration file 9 no longer needs to hard code the address for CMTS 2 as the network can dynamically learn the address for CMTS 2 according to the principles described above. Accordingly, the configuration file 9 need not be updated in conjunction with the fiber node split for CM B.

In the system 100 described above, the pseudowire directly connects the CMTSs 1 and 3. In other examples, the network 19 can include an intermediary router through which the CMTSs can communicate with each other to deliver the point-to-point or multipoint L2VPN services. In such other schemes, the CMTSs 1 and 3 communicate by establishing pseudowires with the intermediary router. It should be understood that in such a scheme, the pseudowire information 6 can include addressing information for the intermediary router, such as an IP address of the intermediary router to cause the CMTS 1 to establish a pseudowire to the intermediary router.

Figure 2:
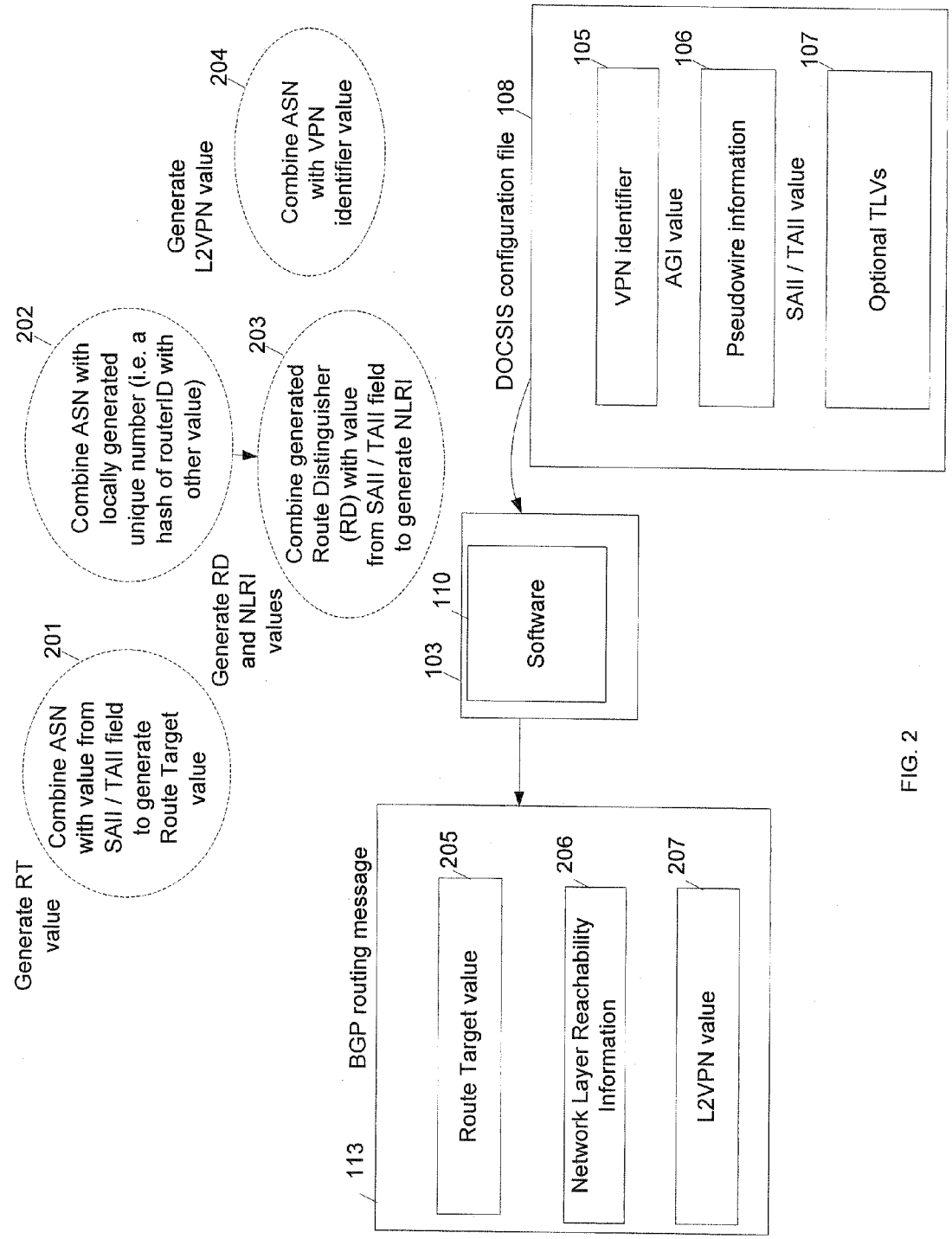
FIG. 2 illustrates one example of a Cable Modem Termination System (CMTS) utilizing the Border Gateway Protocol (BGP) under a direct connection according the principles described in FIG. 1.

FIG. 2 illustrates one example of a Cable Modem Termination System (CMTS) utilizing the Border Gateway Protocol (BGP) according the principles described in FIG. 1.

Before discussing the details of FIG. 2 it should again be noted that the principles described with respect to FIG. 1 can be combined with any routing protocol. Examples of other routing protocols besides BGP that can be used to distribute a notification through a network of CMTSs in response to a fiber node split include, but are not limited to, Intermediate-System to Intermediate-System (IS-IS), Open Shortest Path First (OSPF), and IGP.

Referring now to the BGP implementation described in FIG. 2, the DOCSIS configuration file 108 is stored on a cable modem that is moved to the CMTS 103 in a fiber node split. The DOCSIS configuration file 108 includes Type Length Value (TLV) fields 105 and 106 that include an identifier for the VPN of the cable modem and information for establishing a pseudowire, respectively. Under BGP, the value in the field 105 corresponds to the Attachment Group Identifier (AGI) field of a BGP database. This identifies the VPN of the cable modem. Under BGP, the value in the field 106 corresponds to the Source Attachment Individual Identifier (SAII) field or Target Attachment Individual Identifier (TAII) field of a BGP database. This is pseudowire information to be used by a remote Psuedowire Endpoint (PE), e.g. remote CMTS, for establishing a pseudowire to the CMTS of the cable modem.

The CMTS 103 receives the configuration file 108 and the software processes the information from the fields 105 and 106. In process 201, the software combines an Autonomous System Number (ASN) with the value from the field 106 to generate a Route Target (RT) value. The RT value is used by BGP to decide whether or not to accept a routing message received from another router.

In a multipoint L2VPN service (as opposed to a point-to-point L2VPN service per the previous paragraph), the software 110 generates the RT value differently. Namely, the RT value will contain a VPN identifier value instead of the SAII/TAII value. A difference between the point-to-point and multipoint L2VPN services is as follows. In the point-to-point L2VPN service, MAC learning and bridging are not needed on any router in the IP/MPLS network (including the pseudowire endpoints, e.g. the CMTSs), whereas in the multipoint L2VPN service MAC learning and bridging are needed on the pseudowire endpoints (the CMTSs) and the intermediary routers(s), if present, in the IP/MPLS network.

In process 202, the software 110 combines the ASN with a locally generated unique number to form the Route Distinguisher (RD) value. The locally generated unique number is a hash of a router ID for the CMTS 103 with the VPN identifier value 105. In the point-to-point L2VPN service, this VPN identifier value 105 can be a Virtual Private Wired Service (VPWS) value. In the multipoint L2VPN service, this VPN identifier value 105 can be the VPLS value In process 203, the software 110 combines the generated RD value with the value from the field 106 to generate the Network Layer Reachability Information (NLRI) value 206. In a multipoint L2VPN service (as opposed to a point-to-point L2VPN service), the software generates the NLRI value differently. Namely, the NLRI value will contain address information for the router generating this routing message, instead of the SAE/TAII value, resulting in the second CMTS establishing a pseudowire extending between the second CMTS and the router identified by the address information.

In process 204, the software 110 generates the L2VPN value by combining the ASN value with the VPN identifier value 105. In the point-to-point L2VPN service, this VPN identifier value 105 is a Virtual Private Wired Service (VPWS) value. In the multipoint L2VPN service, this VPN identifier value 105 is the VPLS value. The L2VPN value 207 is to be included in the BGP routing message 113 to be used by a router to setup the L2VPN Extended Community service.

Figure 3:
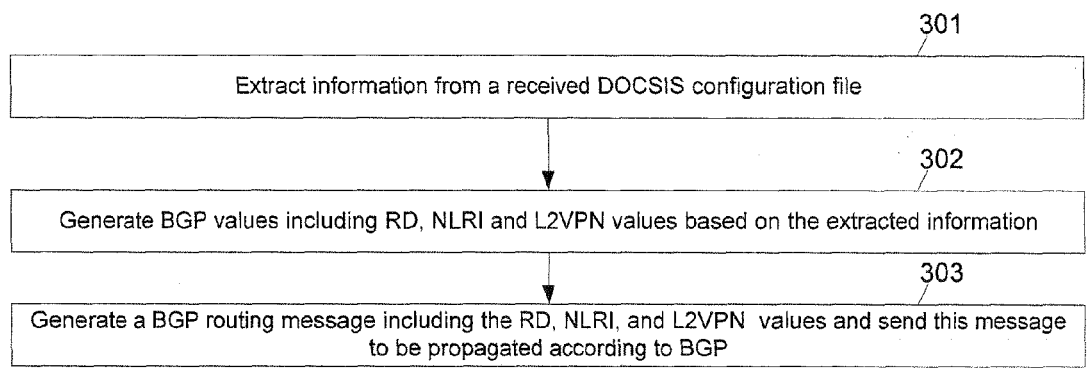
FIG. 3 illustrates how the CMTS shown in FIG. 2 generates and sends a notification using BGP.
Figure 4:
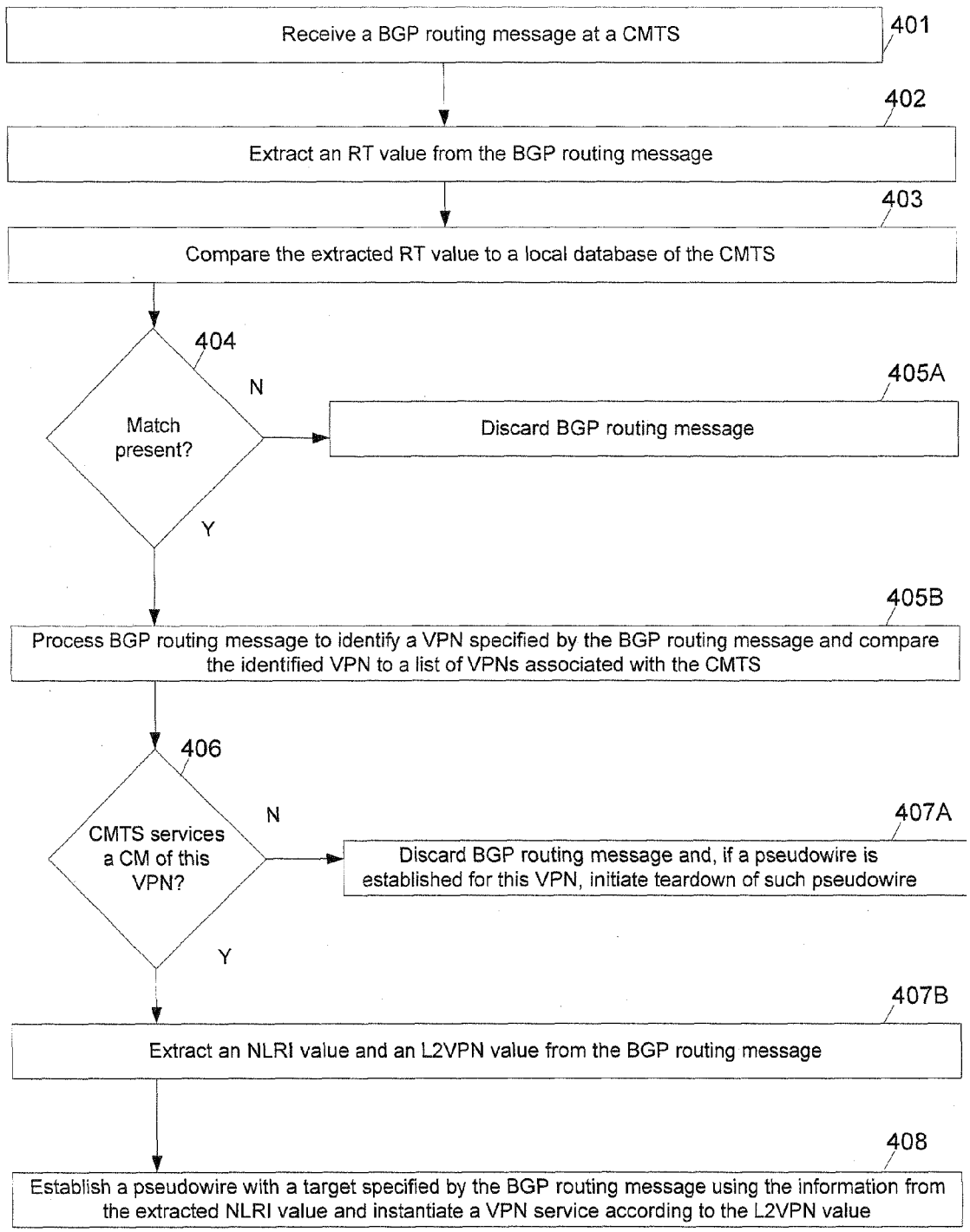
FIG. 4 illustrates how a remote CMTS processes the notification generated and sent according to FIG. 3.

Thereafter, having generated the RT value 205, NLRI value 206, and L2VPN value 207 based on the information from the DOCSIS configuration file 108, the software 110 generates a BGP routing message 113 to send to other routers including remote CMTSs. FIG. 3, which will be described later in more detail, illustrates the above-described process of generating and sending a notification using BGP. FIG. 4, which will be described later in more detail, illustrates the process of a receiving CMTS processing the notification.

The configuration file 108 can also include any combination of optional TLVs 107. A first optional TLV controls whether the routers instantiate a point-to-point or multipoint service. If a multipoint service is requested via the optional TLV 107, then the receiving CMTS, e.g. the CMTS 103, will allocate resources for providing multipoint service. Namely, the receiving CMTS will allocate resources for a bridge domain that can facilitate MAC bridging and learning used by multipoint.

A second optional TLV 108 can be used when the cable modem is connected to a back up CMTS, e.g. the cable modem is connected to two different CMTS with one being a primary and the other being a backup. The second TLV 108 can be used to cause an additional pseudowire to be established to the backup CMTS, e.g. a backup pseudowire.

A third optional TLV 107 can provide an RT value to be used for constructing different VPN topologies. The routers in the network will receive the generated RT value as well as the RT value from the configuration file 108 to establish a particular VPN topology requested by the DOCSIS configuration file 108.

FIG. 3 illustrates how the CMTS shown in FIG. 2 generates and sends a notification using BGP.

In block 301, a first CMTS extracts information from a received DOCSIS configuration file sent by a cable modem registering with the first CMTS. In block 302, the first CMTS generates BGP values including RD, NLRI, and L2VPN values based on the information extracted from the DOCSIS configuration file. In block 303, the first CMTS generates a BGP routing message including the RD, NLRI, and L2VPN values and sends this message to be propagated according to BGP.

FIG. 4 illustrates how another CMTS processes the notification generated and sent according to FIG. 3.

In block 401, a second CMTS receives a BGP routing message. In block 402, the second CMTS extracts an RT value from the BGP routing message. In an initial processing the second CMTS compares the extracted RT value to a local database of the second CMTS in block 403. If no match is present in diamond 404, then in block 405A the second CMTS discards the BGP routing message.

If a match is present in diamond 404, then in block 405B the second CMTS processes the BGP routing message to identify a VPN specified by the BGP routing message and compares the identified VPN to a list of VPNs associated with the second CMTS. If no match is present in the subsequent processing of diamond 406, then in block 407A the second CMTS discards the BGP routing message, and if a pseudowire is established for this VPN, initiates teardown of such existing pseudowire.

If a match is present in diamond 406, then in block 407B the second CMTS extracts an NLRI value and an L2VPN value from the BGP routing message. In block 408 the second CMTS establishes a pseudowire with a target specified by the BGP routing message using information extracted from the NLRI and instantiates a VPN service according to the L2VPN value.

It should be understood that the established psuedowire can be torn down at a later time. In a remotely triggered tear down, the second CMTS tears down the established pseudowire according to a comparison of the notification 13 to the local routing table of CMTS 2 and the local associated VPN. In a locally triggered teardown, the CMTS of the cable modem tears down the established pseudowire based on a disconnection of the cable modem therefrom.

It will be apparent to those having skill in the art that many changes may be made to the details of the above-described embodiments without departing from the underlying principles. As one example, it is noted that the principles described above can be extended to other cable networks besides DOCSIS cable networks. Furthermore, the principles described above can be extended to other access networks besides cable networks, such as, but not limited to, Digital Subscriber Line (DSL) networks and fiber optic networks. The scope of the present disclosure should, therefore, be determined only by the following claims.

Most of the equipment discussed above comprises hardware and associated software. For example, the typical edge device is likely to include one or more processors and software executable on those processors to carry out the operations described. Likewise, the typical edge device manager is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments may include executable programs or instructions that are stored in machine-readable or computer-readable storage media, such as a digital memory. We do not imply that any specific type of computer is required. For example, various processors, embedded or otherwise, may be used in equipment such as the components described herein. The term circuitry used herein can refer to any of the hardware used to execute a program or routine, or to any hardware that can be used to implement the principles described herein independently of software.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there will typically be a corresponding software product at the transmitting end of the transmission, or the receiving end, or both.

Having described and illustrated a particular example, it should be apparent that the above describe example systems may be modified in arrangement and detail without departing from the principles described herein. We claim all modifications and variations coming within the spirit and scope of the following claims.

The invention claimed is:

1. A system, comprising:
a first Cable Modem Termination System (CMTS) encoded with instructions that, if executed, result in:
accessing a Data Over Cable Service Interface Specification (DOCSIS) configuration file sent from a first cable modem in response to the first cable modem coupling to a fiber node of the first CMTS in a fiber node split operation that moves a connection of the first cable modem to the fiber node of the first CMTS following the first cable modem being disconnected from a different fiber node of another CMTS;
extracting, from the DOCSIS configuration file, a network identifier for a virtual private network to having connected the first cable modem to a second cable modem via a Layer 2 Virtual Private Network (L2VPN) connection, the second cable modem coupled to a second CMTS;
extracting, from the DOCSIS configuration file, pseudowire information for discovering a target for establishing a pseudowire between the first CMTS and the second CMTS connecting the second cable modem;
generating a notification using a routing protocol; and
inserting, into the notification, the extracted network identifier and pseudowire information before sending the generated notification to the second CMTS, enabling the second CMTS and the first CMTS to establish the pseudowire to maintain, after the fiber split operation, the L2VPN connection for the virtual private network between the first cable modem and the second cable modem.

2. The system of claim 1, wherein the generated notification is propagated across or flooded within a routing domain of the first CMTS according to the routing protocol.

3. The system of claim 2, further comprising:
a second CMTS encoded with instructions that, if executed, result in:
receiving the notification and processing the same using the routing protocol;
analyzing the network identifier and the pseudowire information contained within the received notification; and
establishing a pseudowire extending from the second CMTS according to the processing, the pseudowire established to communicate with the first CMTS.

4. The system of claim 2, further comprising:
a second CMTS encoded with instructions that, if executed, result in:
receiving the notification and processing the same using the routing protocol;
performing an initial inspection of the received notification to determine whether a route target included in the received notification matches a route target formulated and stored in a local database of the second CMTS;
if there is a match, performing a subsequent inspection of the received notification to access the network identifier and determine whether a group of cable modems terminated by the second CMTS includes any cable modems belonging to a same virtual private network as the network identifier; and
establishing the pseudowire extending from the second CMTS according to the processing, the pseudowire established to communicate with the first CMTS.

5. The system of claim 4, wherein the instructions encoded on the second CMTS, if executed, result in:
if there is no match, discarding the received notification, wherein the subsequent inspection is not performed if the received notification is discarded.

6. The system of claim 4, wherein the route target is generated by combining a value from the DOCSIS configuration file with a value corresponding to the routing domain.

7. The system of claim 1, wherein the instructions encoded on the first CMTS, if executed, result in the first CMTS allocating resources for a bridge domain to be used in a multipoint service according to a setting in the DOCSIS configuration file.

8. The system of claim 1, wherein the instructions encoded on the first CMTS, if executed, result in:
generating a Border Gateway Protocol message using contents of a DOCSIS configuration file stored on a second cable modem.

9. A system, comprising:
a first CMTS encoded with instructions that, if executed, result in:
processing a received notification according to a routing protocol configured on a plurality of routers of a routing domain of the first CMTS, wherein the first CMTS processes the notification in response to a fiber node split operation for a remote cable modem that moves a connection of the remote cable modem to a fiber node of a second CMTS following the remote cable modem being disconnected from a different fiber node of another CMTS having provided a virtual private network connection between the remote cable modem and a second cable modem coupled to the first CMTS via a Layer 2 Virtual Private Network (L2VPN) connection; and
establishing a pseudowire extending from the first CMTS according to the processing, the pseudowire established to communicate with the second CMTS that terminates the remote cable modem, enabling the first CMTS and second CMTS to maintain, after the fiber node split operation, the L2VPN connection for the virtual private network between the remote cable modem and the second cable modem.

10. The system of claim 9, further comprising instructions encoded on the second CMTS that, if executed, result in:
extracting, from a received DOCSIS configuration file, a network identifier;
extracting, from the received DOCSIS configuration file, pseudowire information for discovering a target for a pseudowire;
generating the notification using the routing protocol; and
inserting the extracted network identifier and pseudowire information before sending the generated notification.

11. The system of claim 9, wherein the instructions, if executed, result in:
performing an initial inspection of the received notification to determine whether a route target included in the received notification matches a route target formulated and stored in a local database of the first CMTS;
if there is a match, performing a subsequent inspection of the received notification to access a network identifier included therein and determine whether a group of cable modems terminated by the first CMTS includes any cable modems belonging to a same virtual private network as the network identifier; and establishing the pseudowire according to the determination.

12. The system of claim 11, wherein the instructions, if executed, result in initiating tear down of an existing pseudowire if none of the cable modems of the group belong to the same virtual private network as the network identifier.

13. The system of claim 11, wherein the route target is generated using a value from a DOCSIS configuration file stored on the remote cable modem.

14. The system of claim 11, wherein the pseudowire, if established, is established according to a first value stored in a pseudowire information field of a DOCSIS configuration file of the remote cable modem, wherein the first value is different than a second value stored in a pseudowire information field of a DOCSIS configuration file of a local cable modem terminated by the first CMTS.

15. A method, comprising:

accessing a configuration file sent from a first access device in response to the first access device coupling to a fiber node of a first access router in a fiber node split operation that moves a connection of the first access device to the fiber node of the first access router following the first access device being disconnected from a different fiber node of another access router;

extracting, from the configuration file, a network identifier for a Virtual Private Network (VPN) having connected the first access device to a second access device via a Layer 2 Virtual Private Network (L2VPN) connection, the second access device coupled to a second access router;

extracting, from the configuration file, pseudowire information for establishing a pseudowire between to the first access router and the second access router;

generating a notification using a routing protocol; and inserting into the notification the extracted network identifier and pseudowire information before sending the generated notification to the first access router, enabling the first access router and the second access router to establish the pseudowire to maintain, after the fiber split operation, the L2VPN connection for the VPN between the first access device and the second access device.

16. The method of claim 15, wherein the first access device is a cable modem, a Digital Subscriber Line (DSL) modem, or a fiber optic modem.

17. The method of claim 15, further comprising:

receiving the notification and processing the same using the routing protocol;

analyzing the network identifier and the pseudowire information contained within the received notification; and establishing a pseudowire extending from a second access router according to the processing.

18. The method of claim 17, wherein the pseudowire is established without modifying a configuration file of a second access device that is terminated by the second access router.

19. The method of claim 18, wherein the configuration file of the second access device of the second access router identifies a third access router before and after the pseudowire is established to exchange communications between the first and second access routers.

20. The method of claim 15, wherein the pseudowire extending from a second access router is established without modifying a configuration file of a second access device that is terminated by the second access router.

\* \* \* \* \*

UNITED STATES PATENT AND TRADEMARK OFFICE
CERTIFICATE OF CORRECTION

PATENT NO.        : 8,873,549 B2
APPLICATION NO.   : 12/707626
DATED             : October 28, 2014
INVENTOR(S)       : Rajiv Asati and John T. Chapman It is certified that error appears in the above-identified patent and that said Letters Patent is hereby corrected as shown below:

In the Claims

Claim 1, Column 7, Line 25 - delete "to";

Claim 15, Column 10, Line 2 - delete "to".

Signed and Sealed this
Tenth Day of February, 2015

Michelle K. Lee
*Deputy Director of the United States Patent and Trademark Office*